Dec. 15, 1970  MUNEHARU MOROZUMI  3,546,972
PROFILE SHIFTED INVOLUTE INTERNAL GEARING
Filed Aug. 28, 1968  15 Sheets-Sheet 1

FIG. 1

INVENTOR
MUNEHARU MOROZUMI

BY

ATTORNEYS

Dec. 15, 1970   MUNEHARU MOROZUMI   3,546,972
PROFILE SHIFTED INVOLUTE INTERNAL GEARING
Filed Aug. 28, 1968   15 Sheets-Sheet 15

INVENTOR
MUNEHARU MOROZUMI

BY
McGlew & Toren
ATTORNEYS

United States Patent Office 3,546,972
Patented Dec. 15, 1970

3,546,972
PROFILE SHIFTED INVOLUTE INTERNAL GEARING
Muneharu Morozumi, 293–1 Aza Kitanaka,
Oaza Kurita, Nagano-shi, Japan
Filed Aug. 28, 1968, Ser. No. 755,943
Claims priority, application Japan, Aug. 30, 1967,
42/55,663; May 30, 1968, 43/36,993; May 31,
1968, 43/45,378, 43/45,379
Int. Cl. F16h 1/32
U.S. Cl. 74—804       8 Claims

ABSTRACT OF THE DISCLOSURE

A planetary reduction gearing includes an internal ring gear meshing with one or more pinions. The ring gear and the pinions have involute teeth, and the difference between the number of teeth on the ring gear and the number of the teeth on each pinion is either 1 or 2. The contact ratio is greater than 1. The involute teeth are profile shifted in accordance with addendum modifications which satisfy a particular equation or formula.

BACKGROUND OF THE INVENTION

The present invention relates to profile shifted involute internal gearing which consists of an internal gear and a pinion, wherein gear teeth are cut in either one of the internal gear or pinion or in both of them in a profile shifted manner such that the difference in number of teeth between the internal gear and the pinion is made 1 or 2 and that contact ratio is more than 1.

Internal gears are extensively used as planet gears as they provide intermeshing with center distances smaller than that of external gears of the same size. Thus, they allow a compact design, having a large contact ratio, small specific sliding, small contact stress, and a good acceptance of lubrication oil. Accordingly they have many advantages as reduction gears.

In such gearing, if the difference in number of teeth between an internal gear and a pinion can be made 1 or 2, a considerably large reduction-gear ratio can be obtained in one step. However, practical internal gearing having a difference in number of teeth of 1 or 2 have not been obtained to date because of the interference which is peculiar to internal gearing.

In an effort to solve this problem, Braren of Germany designed so-called cyclo-reduction gears which comprise a combination of special cycloid teeth and trochoid teeth, and now internal reduction gearings having a difference in number of teeth of 1 or 2 are being manufactured by Cyclo GmbH. of Germany and Sumitomo Machinery Industry Co., Ltd., of Japan.

However, as these cyclo-reduction gearings have special teeth, their precision fabrication and precision measuring is very difficult and the tolerance for the center distance at the time of intermeshing is strictly limited.

SUMMARY OF THE INVENTION

In accordance with the invention, in planetary gearing including an internal ring gear and one or more pinions meshing with the ring gear, and in which the difference between the number of teeth and the ring gear and the number of the teeth in the pinions is either one or two, the teeth of the ring gear and the teeth of the pinions are formed as involute teeth which are profile shifted. The contact ratio is 1.0 or larger. Thus, even with ordinary involute teeth, which have shifted profiles, a gearing is provided, including an internal ring gear and one or more pinions meshing therewith, in which the usual interference characteristic of internal gearing is completely obviated.

It has been made clear by many researchers that, in the meshing of gears, particularly when the contact ratio is 2.0 or larger than 2.0, vibration and noise will suddenly be reduced. Thus this is the most important factor for improving the meshing characteristic of gears to make the contact ratio 2.0 or larger than 2.0. As the internal gearing of the invention has ordinary involute teeth, its precision fabrication and precision measuring are easy and, as the tolerance of center distance at the time of intermeshing will not have any effect even theoretically on the conditions required for engagement between a pinion and an internal gear, it is most suitable as an internal reduction gearing. Thus it has a great potential for further development.

On the other hand, internal gears have a number of limitations which will not be found with external gears and, especially when the difference in number of teeth between the internal gear and a meshing pinion is small, this limitation is very severe. Therefore, when these limitations are all satisfied, smooth gearing can be secured. For this, the following conditions need to be satisfied:

The following codes used will have meanings as indicated below:

$m$—module
$\alpha_c$—cutter pressure angle
$Z_1$, $Z_2$—numbers of teeth of pinion and of internal gear, respectively
$i$—gear ratio $(=Z_2/Z_1)$
$x_1$, $x_2$—addendum modification coefficient of pinion and of internal gear, respectively
$h_k$—addendum coefficient (for full depth tooth: $h_k=1$; for stub tooth: $h_k<1$; for larger depth tooth: $h_k>1$)
$r_{K1}$, $r_{K2}$—radius of addendum circle, for pinion and for internal gear, respectively
$\alpha_{K1}$, $\alpha_{K2}$—addendum pressure angles of pinion and of internal gear, respectively
$\alpha_b$—operating pressure angle
$a$—center distance
$\epsilon$—contact ratio (1) The addendum circle of the internal gear must be larger than the base circle.
Condition equation:

$$Z_2 \geq \frac{2(h_k - x_2)}{1 - \cos \alpha_c}$$

or, $$\alpha_{K2} \geq 0$$

(2) The addendum or tip of the internal tooth must not be sharply pointed.
Condition equation:

$$\frac{\pi}{2} - 2x_2 \tan \alpha_c - Z_2(\text{inv } \alpha_c - \text{inv } \alpha_{K2}) \geq 0$$

Provided that:

$$\text{inv } \alpha_{K2} = \tan \alpha_{K2} - \alpha_{K2}$$

$$\cos \alpha_{K2} = \frac{Z_2 \cos \alpha_c}{Z_2 - 2h_k + 2x_2}$$

(3) The addendum or tip of the pinion tooth must not be sharply pointed.
Condition equation:

$$x_1 = \frac{\frac{\pi}{4} \cot \alpha_c - h_K}{\frac{B(\alpha)}{B_v(\alpha)}} - h_K$$

$$Z_1 = \frac{2(h_K + x_1)}{B_v(\alpha)}$$

Provided that:

$$B(\alpha) = \frac{\text{inv } \alpha - \text{inv } \alpha_c}{\tan \alpha_c}$$

$$B_v(\alpha) = \frac{\cos \alpha_c}{\cos \alpha} - 1$$

(4) Pinion must not have as undercut.
Condition equation:

$$x_1 \geq h_K - \frac{1}{2} Z_1 \sin^2 \alpha_c$$

(5) The operating pressure angle must not be negative.
Condition equation:

$$Z_2 \geq Z_1 + \frac{2 \tan \alpha_c}{\text{inv } \alpha_c}(x_1 - x_2)$$

(6) Contact ratio must be larger than 1.0.
Condition equation:

$$\epsilon = \frac{1}{2\chi}\{Z_1(\tan \alpha_{K1} - \tan \alpha_b) + Z_2(\tan \alpha_b - \tan \alpha_{K2})\} > 1$$

Provided that:

$$\text{inv } \alpha_b = \text{inv } \alpha_c + \tan \alpha_c \frac{x_2 - x_1}{Z_2 - Z_1}$$

$$\cos \alpha_{K1} = \frac{Z_1 \cos \alpha_c}{Z_1 + 2h_K + 2x_1}$$

To give the preferable contact ratio of more than 2.0 the condition equation will be as under:

$$\epsilon = \frac{1}{2\chi}\{Z_1(\tan \alpha_{K1} - \tan \alpha_b) + Z_2(\tan \alpha_b - \tan \alpha_{K2})\} > 2$$

(7) Avoid involute interference.
Condition equation:

$$\frac{Z_1}{Z_2} \geq 1 - \frac{\tan \alpha_{K2}}{\tan \alpha_b}$$

(8) Avoid trochoidal interference.
Condition equation:

$$\frac{\sigma}{i} + (\text{inv } \alpha_b - \text{inv } \alpha_{K2}) - \cos^{-1}$$

$$\frac{a^2 + r_{K2}^2 - r_{K1}^2}{2ar_{K2}} \geq 0$$

Provided that:

$$\cos\{\sigma - (\text{inv } \alpha_{K1} - \text{inv } \alpha_b)\} = \frac{r_{K2}^2 - r_{K1}^2 - a^2}{2ar_{K1}}$$

$$r_{K1} = (Z_1/2 + h_K + x_1)m$$

$$r_{K2} = \left(\frac{Z_2}{2} - h_K + x_2\right)m$$

$$a = \frac{1}{2}(Z_2 - Z_1)\frac{\cos \alpha_c}{\cos \alpha_b}m$$

(9) Avoid trimming of the internal gears.
Condition equation:

$$\sin^{-1}\sqrt{\frac{1 - (\cos \alpha_{K1}/\cos \alpha_{K2})^2}{1 - (Z_1/Z_2)^2}} + \text{inv } \alpha_{K1}$$

Provided that:

$$-\text{inv } \alpha_b - \frac{Z_2}{Z_1}\left\{\sin^{-1}\sqrt{\frac{(\cos \alpha_{K2}/\cos \alpha_{K}^1)^2 - 1}{(Z_2/Z_1)^2 - 1}}\right.$$

$$\left. + \text{inv } \alpha_{K2} - \text{inv } \alpha_b\right\} \geq 0$$

(10) When the difference in number of teeth between the internal gear and the pinion is small, the pinion must be inserted into the internal gear with a prescribed center distance without interference between the addendum of the pinion and the addendum of the internal gear.

$$2 - \frac{4h_K}{Z_2 - Z_1} + B(\alpha_b) + B_v(\alpha_b) > 0$$

Provided that:

$$B(\alpha_b) = \frac{2(x_2 - x_1)}{(Z_2 - Z_1)}\left(= \frac{\text{inv } \alpha_b - \text{inv } \alpha_c}{\tan \alpha_c}\right)$$

$$B_v(\alpha_b) = \left(\frac{\cos \alpha_c}{\cos \alpha_b} - 1\right)$$

On the other hand, a radial clearance must exist between the bottom land of the internal gear teeth and the tip or tooth crest of the pinion teeth, and there must not be interference between the fillet, at the dedendum of the internal gear teeth, and the addendum of the pinion teeth. However, since the addendum of a pinion cutter for cutting the internal gear is so made that it will have an extra height which is equivalent to the radial clearance, these problems may be generally disregarded.

Figure 1:
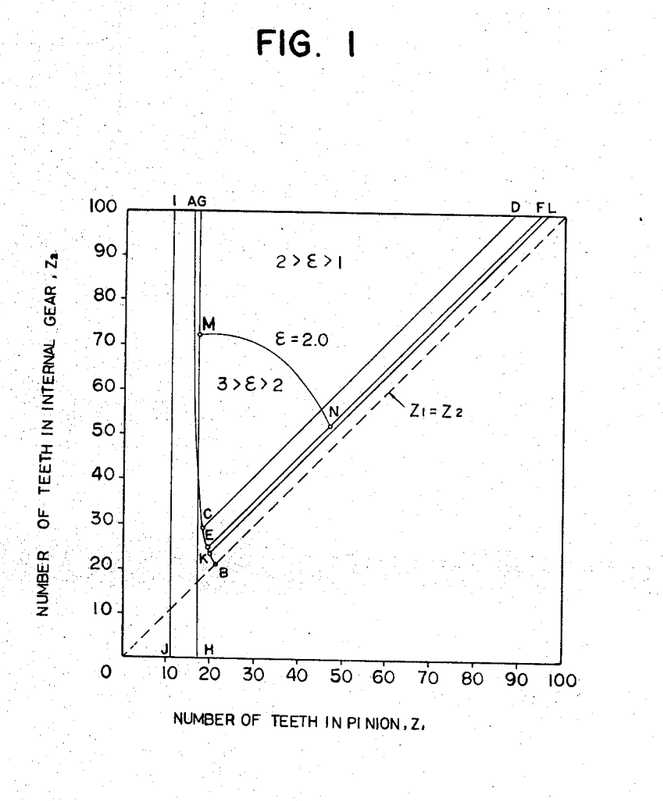

The combined interference line diagram as indicated in FIG. 1 was made by calculating the values of $Z_1$, $Z_2$, $x_1$, $x_2$ which satisfy the condition equations shown above, provided that:

$\alpha_c = 14.5°$ and $20°$
$h_K = 1.0$
$x_1 = 1.0$ to $-1.0$ (calculated at every 0.1 value)
$x_2 = 1.0$ to $0$ (calculated at every 0.1 value)

Then, the interference line diagrams are made to cover all combinations of:

$\alpha_c = 14.5°$, $20°$
$h_K = 1.0$
$x_1 = 1.0$ to $-1.0$ (calculated at every 0.1 value)
$x_2 = 1.00$ to $0$ (calculated at every 0.1 value)

Thus 112 diagrams including the line diagrams for the pinion cutter besides the ones for pinion were obtained.

In FIG. 1:

Curve AB—critical curve for involute interference;
Curve CD—critical curve for trimming;
Curve EF—critical curve for trochoidal interference;
Straight line GH—critical line for undercut of pinion;
Straight line IJ—critical line for sharp point of addendum or tip of pinion;
Straight line KL—critical line for operating pressure angle: $\alpha_b = 0$
Curve MN—characteristic curve for contact ratio.

In the figures, the area to the right of curve AB, straight lines GH, IJ, and above the curves CD, EF and straight line KL is the safety zone against various interferences.

By using these diagrams, the numbers of teeth and addendum modification coefficient of the internal gear and of the pinion, which satisfy all conditions shown in Equations 1 through 10 above, are easily determined. For applying these diagrams for a stub tooth and a larger depth tooth instead of a full depth tooth, $Z_1/h_K$, $Z_2/h_K$, $x_1/h_K$, $x_2/h_K$ may be used in place of $Z_1$, $Z_2$, $x_1$, $x_2$.

FIG. 2 through FIG. 9 show examples of the above mentioned 112 diagrams for combined interference lines.

Table 1 shows a list of these diagrams.

TABLE 1

Figure 2:
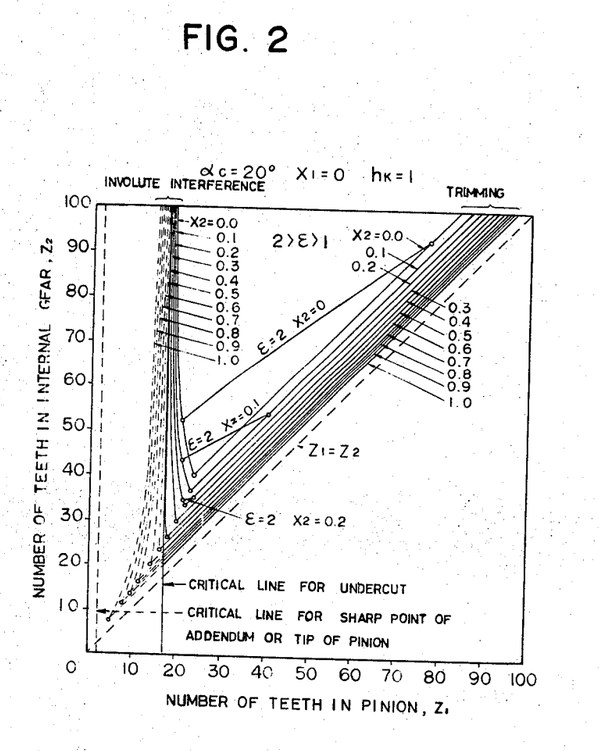
Figure 3:
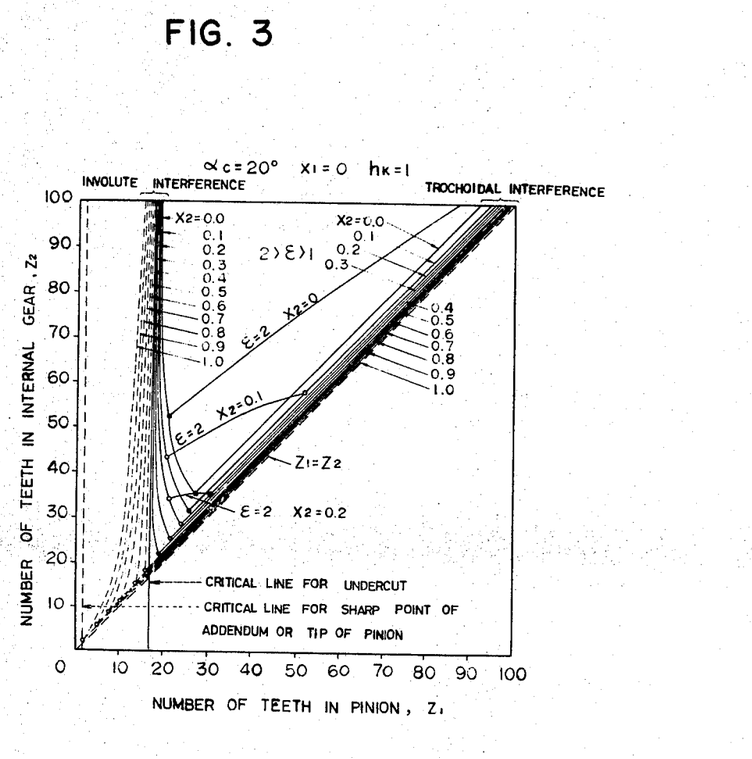
Figure 4:
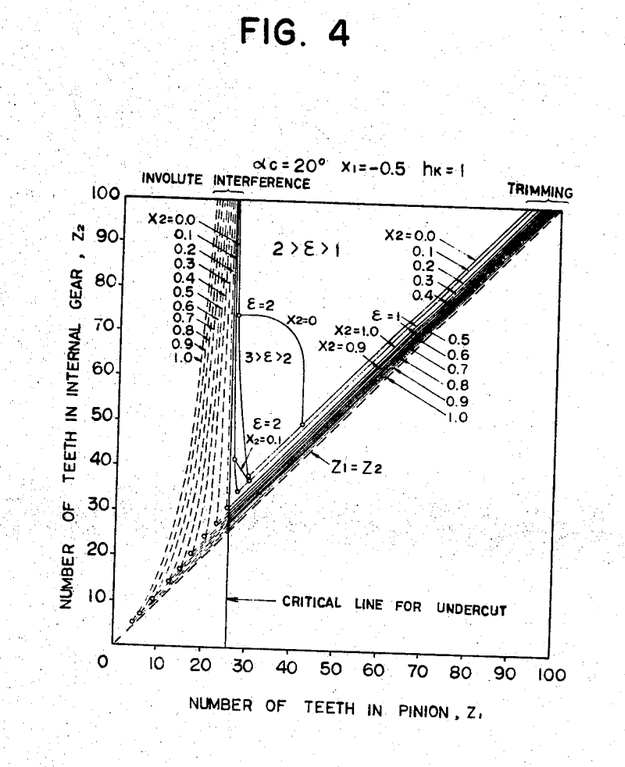
Figure 5:
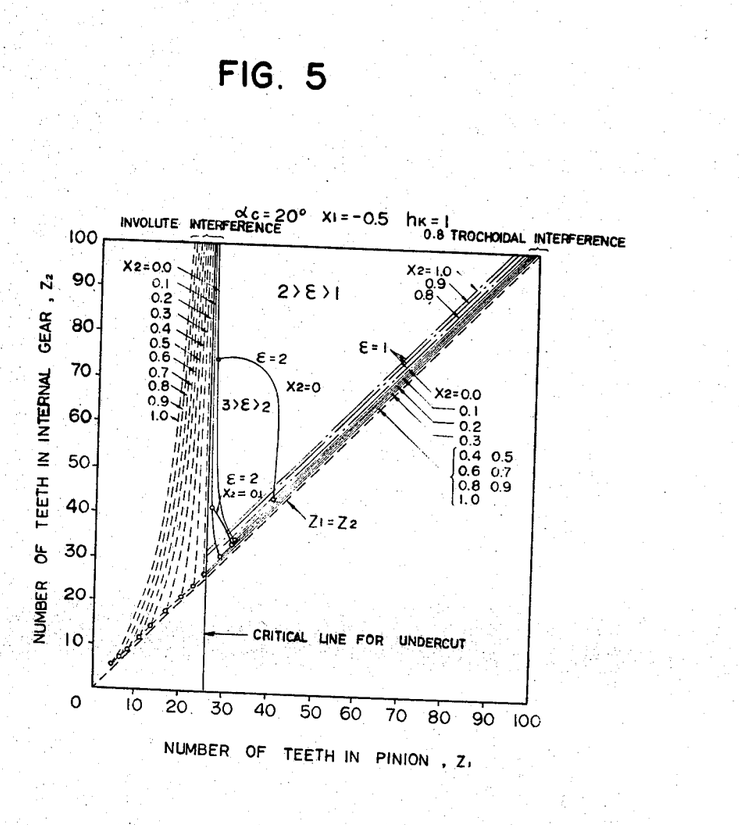
Figure 6:
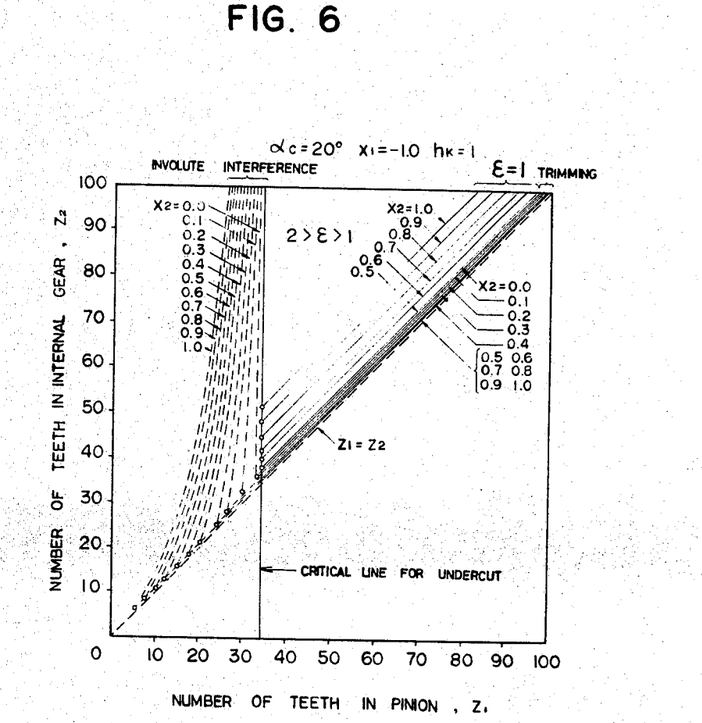
Figure 7:
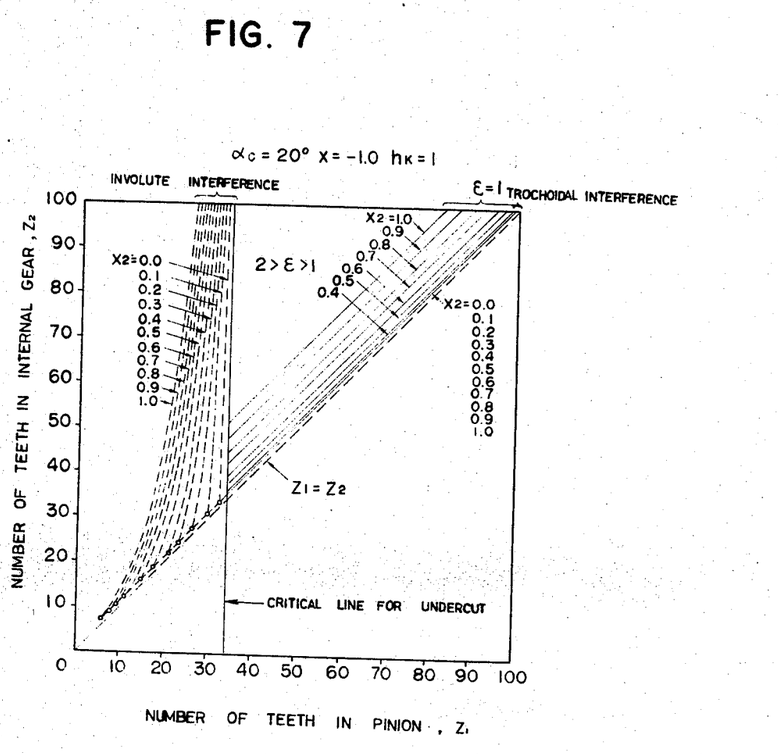
Figure 8:
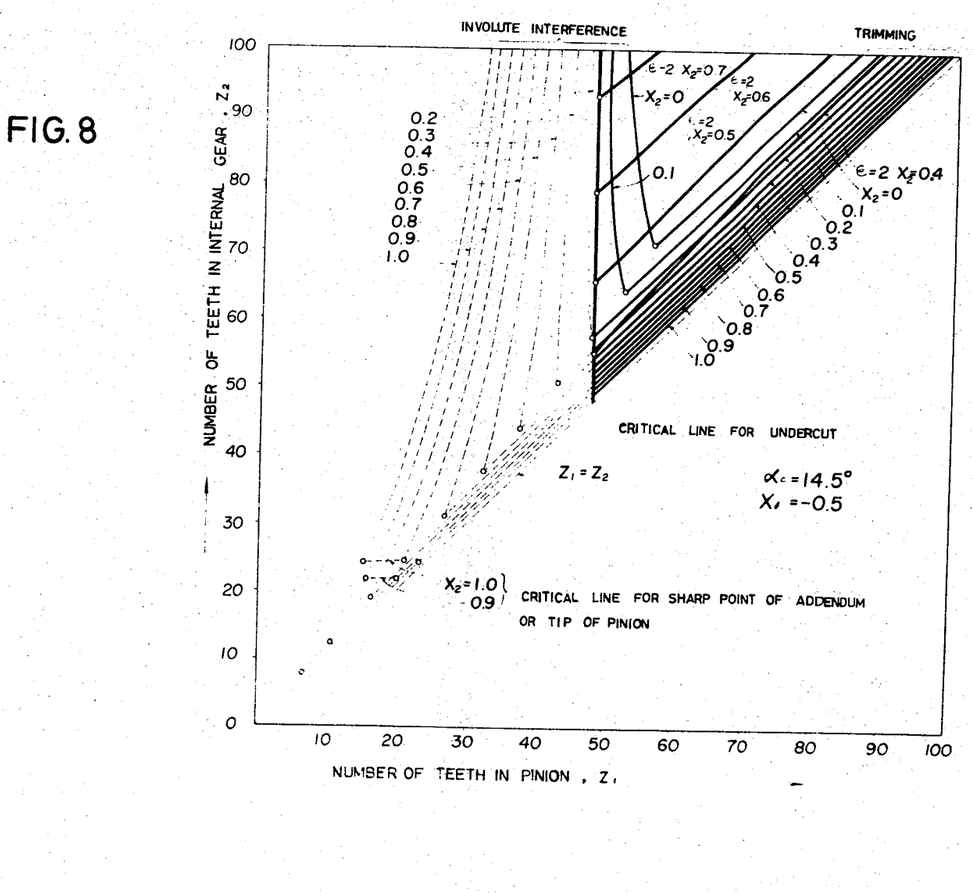
Figure 9:
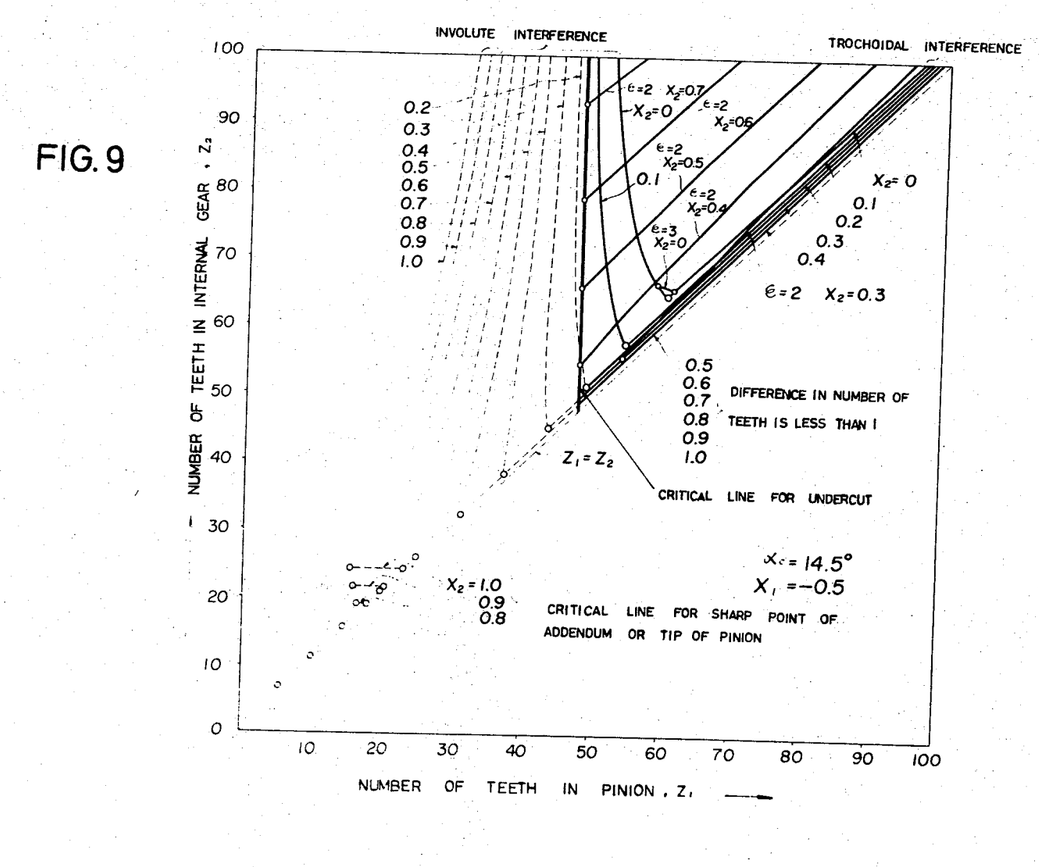

| | $\alpha_c$ and $h_K$ | | |
|---|---|---|---|
| $x_1$ | | $\alpha_c = 20°$, $h_K = 1$ | $\alpha_c = 14.5°$ $h_K = 1$ |
| Interference | 0 | $-0.5$ | $-1.0$ | $-0.5$ |
| Trimming | | Fig. 2 | Fig. 4 | Fig. 6 | Fig. 8 |
| Trochoidal interference | Fig. 3 | Fig. 5 | Fig. 7 | Fig. 9 |

Figure 10:
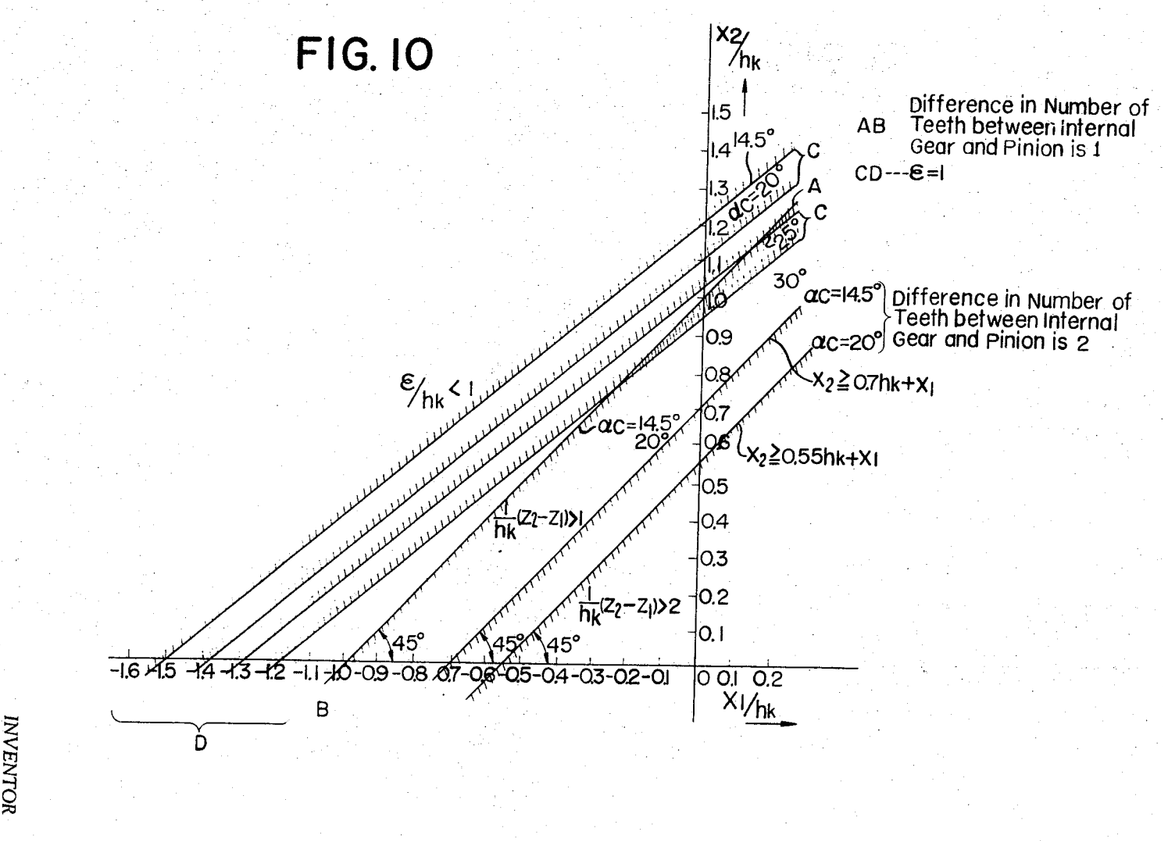

The relation between the addendum modification coefficient $x_1$ and $x_2$ of profile shifted internal gears, which makes the contact ratio larger than 1, when the pinion and the internal gear smoothly engage with each other with a difference in number of teeth of 1, was obtained from the diagram of combined interference lines with the result shown in FIG. 10.

That is, when $x_1/h_K$ is the abscissa and $x_2/h_K$ is the ordinate, gears can intermesh, with a difference in number of teeth of 1 and without trochoidal interference, at the zone above the straight line AB, while the contact ratio will become larger than 1 at the zone below the straight line CD.

Therefore, the portion between the straight lines AB and CD defines the limited area for $x_1$ and $x_2$, wherein gears can engage with a difference in number of teeth of 1 and with a contact ratio of larger than 1.

That is, to show concrete examples, in FIG. 10 for instance, when $\alpha_c=20°$, such combination as $(x_1/h_K=0.1, x_2/h_K=1.1)$, $(x_1/h_K=0, x_2/h_K=1.0)$, $(x_1/h_K=-0.6, x_2/h_K=0.4)$, $(x_1/h_K=-1.0, x_2/h_K=0)$, $(x_1/h_K=-1.1, x_2/h_K=0.1)$ are adopted, internal gearing with a difference in number of teeth of 1 and a contact ratio of larger than 1 can be obtained. Thus the combination of $x_1/h_K$ and $x_2/h_K$ can be made freely as positive and positive; 0 and positive; negative and positive; negative and 0; negative and negative, allowing very free selection of $x_1/h_K$ and $x_2/h_K$. Therefore, even if the value of $x_2/h_K$ is limited due to the limited relationship between the number $Z_2$ of teeth of the internal gear and the addendum modification coefficient $x_2$, which is generated when the above internal gear is cut with a pinion cutter, the value of $x_1/h_K$ which corresponds to said value of $x_2/h_K$ may be obtained by using FIG. 10. While the straight line CD is a limit line for the contact ratio $\epsilon=1$, the separation between this straight line CD and the straight line AB in a vertical direction will become gradually larger as the point on the straight line AB moves in the lower left direction from A to B. Thus a large contact ratio may be secured. Therefore, the portion near the point of intersection $(x_1/h_K=-1.0, x_2/h_K=0)$ of the straight line AB and the abscissa is the important portion from a practical point of view, where practical demand is highest. Namely, the combination of $(x_1/h_K=-0.1, x_2/h_K=0)$ will provide a greater contact ratio than that of the combination $(x_1/h_K=0, x_2/h_K=1.0)$ and $(x_1/h_K=-0.6, x_2/h_K=0.4)$, etc., and will provide better intermeshing properties.

When the difference in number of teeth is 2, the straight line AB will be shifted downwards, and thus the safety zone is widened.

The limited range of $x_1$ and $x_2$ in which the gears engage with a difference in number of teeth of 1 and with a contact ratio of larger than 1 is shown in the following equation.

$$(0.0002\alpha_c^2 - 0.025\alpha_c + 1.52)h_K + 0.8x_1 \geq x_2 \geq h_K + x_1 \quad (1)$$

Provided that:

$\alpha_c$—cutter pressure angle (degree)

$h_K$—addendum coefficient (for full depth tooth: $h_K=1$, for stub tooth: $h_K<1$, for larger depth tooth: $h_K>1$)

$x_2$—addendum modification coefficient of internal gear $x_1$—addendum modification coefficient of pinion When $\alpha_c=14.5°, 20°, 25°, 30°$, the following equations will apply:

when $\alpha_c=14.5°$, $1.2h_K + 0.8x_1 \geq x_2 \geq h_K + x_1$
when $\alpha_c=20°$, $1.1h_K + 0.8x_1 \geq x_2 \geq h_K + x_1$
when $\alpha_c=25°$, $1.03h_K + 0.8x_1 \geq x_2 \geq h_K + x_1$
when $\alpha_c=30°$, $0.95h_K + 0.8x_1 \geq x_2 \geq h_K + x_1$ Based on the above, internal gearing engaging with a difference in number of teeth of 1, under $\alpha_c=20°$, $h_K=1$, is obtained using the Equation 1.

There, the combination of $(x_1=0, x_2=1.0)$ or $(x_1=-1.0, x_2=0)$ is used. The result is shown in Table 2.

TABLE 2

| | Internal gear | | | | Pinion | | Contact ratio, $\epsilon$ | Diagram used |
|---|---|---|---|---|---|---|---|---|
| $m$ | $\alpha_c$ | $h_K$ | $Z_2$ | $x_2$ | $Z_1$ | $x_1$ | | |
| 3 | 20° | 1 | 20 | 1.0 | 19 | 0 | 1.002 | Fig. 10, Fig. 3. |
| 4 | | | 30 | 1.0 | 29 | 0 | 1.05 | Fig. 10, Fig. 3. |
| 3 | | | 50 | 0 | 49 | −1.0 | 1.46 | Fig. 10, Fig. 7. |

Figure 12A:
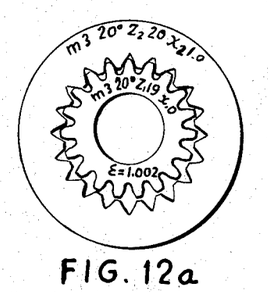
Figure 12B:
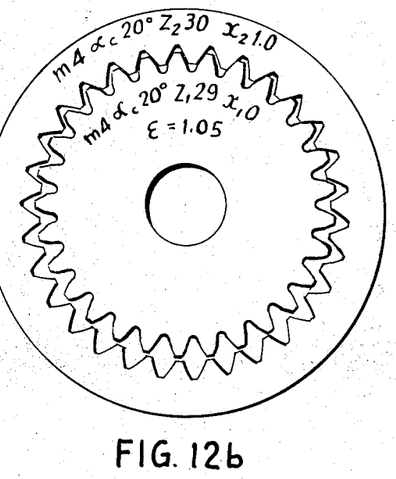
Figure 12C:
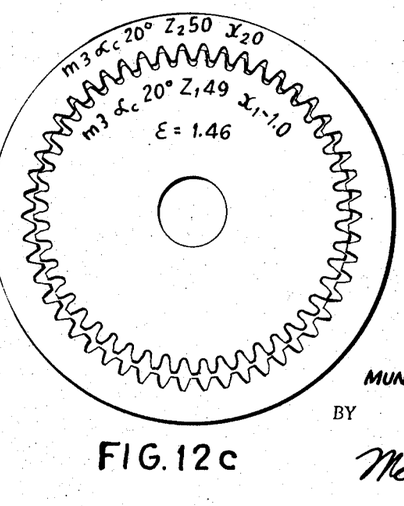

FIGS. 12a, b, c are photographs showing such internal gearings. These internal gearings are subjected to trimming, but in this case, as $d_{K1} > d_{K2}$, a pinion must be assembled to an internal gear by inserting it in the axial direction at the prescribed center distance. Therefore it is not necessary to consider about trimming.

Figure 11:
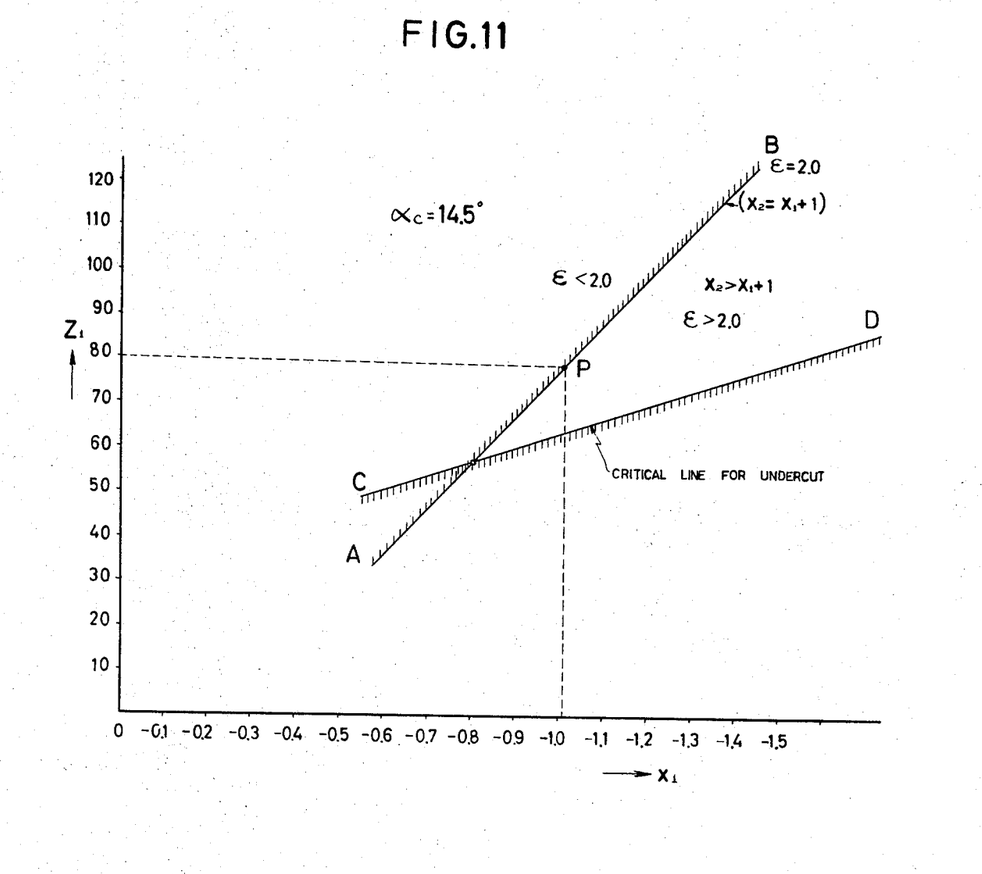

On the other hand, from the 112 combined interference line diagrams such as shown in FIG. 8 and FIG. 9, the relation between the addendum modification coefficient $x_1$ and the number of teeth $Z_1$ of the pinion for such profile shifted internal gearing intermeshing smoothly with a difference in number of teeth of 1 and a contact ratio of 2.0 or more than 2.0, was obtained with a result shown in FIG. 11.

That is, when $x_1$ is the abscissa and $Z_1$ is the ordinate, gears can engage with a difference in number of teeth of 1 and a contact ratio of larger than 2.0, and without trochoidal interference at the zone below the straight line AB. At the zone above the straight line CD, there is no undercut for the pinion. Therefore, the area between the straight lines AB and CD shows the limited zone for $x_1$ and $Z_1$ wherein gears engage with a difference in number of teeth of 1, and a contact ratio of 2.0 or larger than 2.0.

Figure 13:
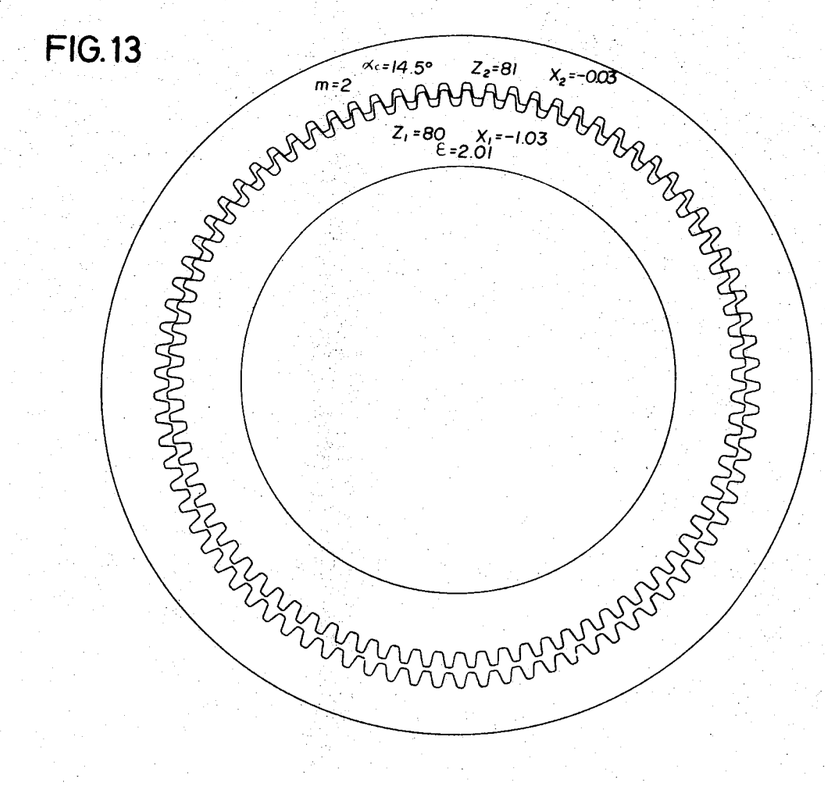

Now, from what has been described above, such internal gearing intermeshing with a difference in number of teeth of 1, under $\alpha_c=14.5°$, $h_K=1$, was obtained using FIG. 11. Point P $(x_1=-1.03, x_2=-0.03, Z_1=80)$ was adopted. Results are shown in Table 3. FIG. 13 shows a a drawing of this internal gear.

TABLE 3

| | Internal gear | | | | Pinion | | Contact ratio, $\epsilon$ | Diagram used |
|---|---|---|---|---|---|---|---|---|
| $m$ | $\alpha_c$ | $h_K$ | $Z_2$ | $x_2$ | $Z_1$ | $x_1$ | | |
| 2 | 14.5° | 1 | 81 | −0.03 | 80 | −1.03 | 2.01 | Fig. 11. |

Next, explanations will be made of the reduction gears as embodiments of the present invention referring to FIG. 14 through FIG. 17.

Figure 14:
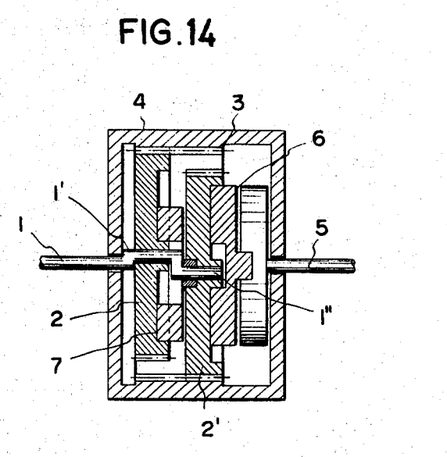
Figure 15:
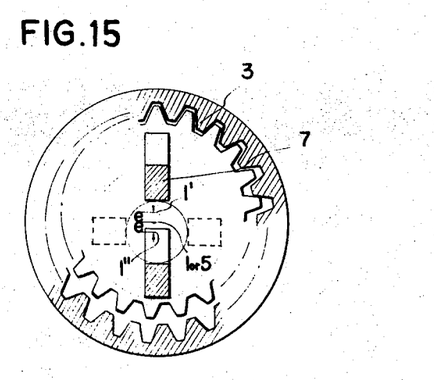

In FIG. 14 and FIG. 15, 1 is a drive shaft having at its end crank shaped bent portions 1' and 1", to which a planet external gear 2 and a planet external gear 2' having the same shape as that of said planet gear 2 are fixed respectively. (That is, the positional relationship between planet external gears 2 and 2' is, as being apparent from FIG. 15, such as having the phase difference of 180° to each other and the eccentricity of $2 \times e$ thus said planet gears are balanced.)

3 is a stationary internal gear fixed within a casing 4, and planet external gears 2 and 2' engage with the stationary internal gear 3.

5 is a driven shaft on an extended line of the center line of the drive shaft 1, and said driven shaft and the planet external gear 2' are connected together by an Oldham's coupling 6 and the planet external gears 2' and 2 are connected together by Oldham's coupling 7.

Therefore, when the drive shaft 1 is rotated, the planet gears 2 and 2' which engage with the stationary internal gear 3 rotate and revolve accordingly. The torque derived from said revolution is transmitted to the driven shaft 5 through the Oldham's coupling 6. Now, the number of teeth of said stationary internal gear 3 is expressed by $Z_2$, the number of external teeth of planet gears 2 and 2' is expressed by $Z_1$, and the number of rotations of the drive shaft 1 is expressed by $\eta_A$, the number of absolute rotations $\eta_1$ of the planet gears will be expressed by the following formula.

$$\eta_1 = -\eta_A \frac{Z_2 - Z_1}{Z_1} \quad (2)$$

when $Z_2 - Z_1 = 1$, $$\eta_1 = -\eta_A \frac{1}{Z_1} \quad (3)$$

In this case, as being apparent from previously mentioned Formula 3, the difference between the number of teeth $Z_2$ of the stationary internal gear and the number of teeth $Z_1$ of the planet external gears which engage with said stationary gear is made as 1, and thereby the rotation of the planet external gears will be a low speed rotation as expressed in Formula 3.

This rotation can be directly transmitted to and can rotate the driven shaft 5 through the Oldham's coupling.

As explained above, this reduction gearing according to the present invention has a stationary internal gear 3 and two planet external gears 2, 2' which engage with said stationary internal gear 3 and have a phase difference of 180°, and planet external gears 2, 2' are fixed to a crank shaped drive shaft. Furthermore planet gears 2 and 2' are connected together by an Oldham's coupling 7, and the torque of planet gears 2 and 2', derived from their rotation, is transmitted to the driven shaft 5 through Oldham's coupling 6.

Thus this apparatus has such advantages as obtaining a high reduction gear ratio by making the number of teeth in the stationary internal gear (3) one more than the number of teeth of the planet external gears 2 and 2', and as having the reduction gearing operate with a good balance by properly combining the two planet gears having a phase difference of 180°, with each other. Further advantages include transmitting the torque dividedly to the two planet gears, enabling the gears to be operated without receiving undue force and in the optimum condition for function of gears.

Figure 16:
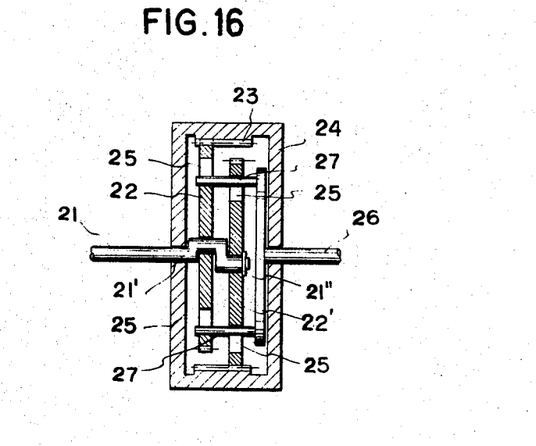
Figure 17:
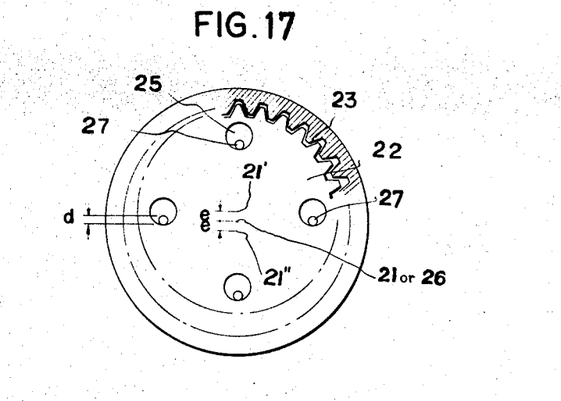

Next, in FIG. 16 and FIG. 17, 21 is a drive shaft having at its end crank-shaped bent portions 21' and 21", to which a planet external gear 22, and a planet external gear 22', having the same shape as that of the eccentric gear 22 are assembled, respectively. (That is, the positional relationship between the planet gears 22 and 22' is, as apparent from FIG. 17, such that a phase difference of 180° and an eccentricty of 2 × $e$ exist therebetween, and the balance of said eccentric external gears is maintained.)

23 is a stationary internal gear fixed within a casing 24 and the above mentioned planet external gears 22 and 22' are engaged with the stationary internal gear 23.

25 are drive-pin-positioning openings bored in the webs of the planet external gears 22 and 22', and drive pins 27, which are integral with a driven shaft 26, are inserted into said drive-pin-positioning openings 25. The relationship between the size of said pins 27 and that of the pin positioning openings will be such that, when the diameter of the pins 27 is $d$, the diameter of pin positioning openings 25 will be $(d+2e)$.

As apparent from the above mentioned Formula 3, when the difference between the number of teeth $Z_2$ of the stationary internal gear and the number of teeth $Z_1$ of the planet gears engaging with the stationary gear is made one, the rotation speed of the planet gears can be made to such low level as indicated by the Formula 3.

This rotation can be transmitted directly to the driven shaft 26 through pin 27.

As explained above, this reduction gearing according to the present invention has a stationary internal gear 23 and two planet external gears 22, 22' which engage with said stationary internal gear 23 and have a phase difference of 180°. The planet gears 22 and 22' are assembled to a crank-shaped drive shaft, and the torque of the planet gears 22 and 22', derived from rotating these gears 22 and 22', is transmitted to a driven shaft 26 through pins 27.

Thus this apparatus has such advantages as obtaining a high reduction gear ratio by making the number of teeth of the stationary internal gear 23 one more than the number of teeth of the planet external gears 22, and 22', as having the reduction gearing smoothly operated with a good balance by adequately combining the two planet external gears having a phase difference of 180° relative to each other, and further such as transmitting the torque dividedly to the two planet gears, enabling the gears to be operated without receiving undue force and in the optimum condition for the function of gears.

What is claimed is:

1. Reduction gearing comprising, in combination, an internal ring gear; and at least one pinion gear within and meshing with said internal ring ear; the number of teeth of said internal ring gear differing by at least 1 and not more than 2 from the number of teeth of each of said pinion gears, and the teeth contact ratio being greater than 1; said gears having involute profile gear teeth with modified addendum coefficients; the relation between the addendum modification coefficient $x_2$ of the internal ring gear and the addendum modification coefficient $x_1$ of the pinion satisfying the expression:

$$(0.0002\alpha_c^2 - 0.025\alpha_c + 1.52)h_K + 0.8x_1 \geq x_2 \geq Kh_K + x_1$$

wherein $\alpha_c$ is the cutter pressure angle, $h_K$ is the addendum coefficient, K is 1 when the difference in the number of teeth is 1, and is a function of $\alpha_c$ when said difference is 2.

2. Reduction gearing comprising, in combination, an internal ring gear; and at least one pinion gear within and meshing with said internal ring gear; the number of teeth of said internal ring gear differing by 1 from the number of teeth of each of said pinion gears, and the teeth contact ratio being at least 2.0; said gears having involute profile gear teeth with modified addendum coefficients; the cutter pressure angle $\alpha_c$, the number of teeth $Z_1$ of each pinion gear, the number of teeth $Z_2$ of the internal ring gear, the addendum modification coefficient $x_1$ of each pinion gear, and the addendum modification coefficient $x_2$ of the internal ring gear satisfying the expressions:

(1) $\quad Z_2 - Z_1 = 1$ the difference in number of teeth between the internal ring gear and each pinion gear (2) $\quad x_1 \geq h_K - \frac{1}{2} Z_1 \sin^2 \alpha_c$ Condition for no undercutting of pinion teeth (3)

$$\frac{1}{2\pi}\{Z_2(\tan\alpha_{K1} - \tan\alpha_b) + Z_2(\tan\alpha_b - \tan\alpha_{K2})\} \geq 2.0$$

condition for a contact ratio of at least 2.0 when $$\text{inv } \alpha_b = \text{inv } \alpha_c + 252 \tan \alpha_c \frac{X_2 - X_1}{Z_2 - Z_1}$$

$$\cos \alpha_{K1} = \frac{Z_1 \cos \alpha_c}{Z_1 + 2h_K + 2x_1}$$

$$\cos \alpha_{K2} = \frac{Z_2 \cos \alpha_c}{Z_2 - 2h_K + 2x_2}$$

(4)

$$\frac{\sigma}{i} + (\text{inv } \alpha_b - \text{inv } \alpha_{K2}) + \cos^{-1} \frac{a^2 + r_{K2}^2 - r_{K1}^2}{2ar_{K2}} \geq 0$$

condition for no trochoidal interference when $$\cos\{\sigma - (\text{inv } \alpha_{K1} - \text{inv } \alpha_b)\} = \frac{r_{K2}^2 - r_{K1}^2 - a^2}{2ar_{K1}}$$

$$r_{K1} = \left(\frac{Z_1}{2} + h_K + x_1\right)m$$

$$r_{K2} = \left(\frac{Z_2}{2} - h_K + x_2\right)m$$

$$a = \text{inv } \frac{1}{2}(Z_2 - Z_1) \frac{\cos \alpha_c}{\cos \alpha_b} m$$

with $\alpha_b$ the same as above.

3. Reduction gearing, as claimed in claim 1, including a drive shaft having two crank portions; two identical said pinion gears each mounted on a respective crank portion and said two pinion gears constituting planet gears meshing with said internal ring gear, said planet gears having a phase displacement of 180° relative to each other; a driven shaft substantially coaxial with said drive shaft; a first Oldham's coupling interconnecting said two planet gears; and a second Oldham's coupling connecting one of said planet gears to said driven shaft.

4. Reduction gearing, as claimed in claim 1, including a drive shaft having two crank portions; two identical said pinion gears each mounted on a respective crank portion and said two pinion gears constituting planet gears meshing with said internal ring gear, said planet gears having a phase displacement of 180° relative to each other; a driven shaft substantially coaxial with said drive shaft; each of said planet gears being formed with the same number of drive pin receiving openings in the associated web; and drive pins, equal in number to the number of openings in the web of each planet gear, fixed to said driven shaft, each drive pin extending, with clearance, through respective openings of both planet gears.

5. Reduction gearing, as claimed in claim 2, including a drive shaft having two crank portions; two identical said pinion gears each mounted on a respective crank portion and said two pinion gears constituting planet gears meshing with said internal ring gear, said planet gears having a phase displacement of 180° relative to each other; a driven shaft substantially coaxial with said drive shaft; a first Oldham's coupling interconnecting said two planet gears; and a second Oldham's coupling connecting one of said planet gears to said driven shaft.

6. Reduction gearing, as claimed in claim 2, including a drive shaft having two crank portions; two identical said pinion gears each mounted on a respective crank portion and said two pinion gears constituting planet gears meshing with said internal ring gear, said planet gears having a phase displacement of 180° relative to each other; a driven shaft substantially coaxial with said drive shaft; each of said planet gears being formed with the same number of drive pin receiving openings in the associated web; and drive pins, equal in number to the number of openings in the web of each planet gear, fixed to said driven shaft, each drive pin extending, with clearance, through respective openings of both planet gears.

7. Reduction gearing comprising, in combination, an internal ring gear having involute profile gear teeth; a drive shaft having two crank portions; two identical planet pinions meshing with said internal ring gear and each mounted on a respective crank portion of said drive shaft, said planet pinion gears being displaced in phase by 180° relative to each other; the number of teeth of said internal ring gear exceeding by 1 the number of teeth of each of said planet pinion gears; a driven shaft substantially coaxial with said drive shaft; a first Oldham's coupling interconnecting said planet pinion gears; and a second Oldham's coupling connecting one planet gear to said driven shaft.

8. Reduction gearing comprising, in combination, an internal ring gear having involute profile gear teeth; a drive shaft having two crank portions; two identical planet pinions meshing with said internal ring gear and each mounted on a respective crank portion of said drive shaft, said planet pinion gears being displaced in phase by 180° relative to each other; the number of teeth of said internal ring gear exceeding by 1 the number of teeth of each of said planet pinion gears; a driven shaft substantially coaxial with said drive shaft; each of said planet pinion gears being formed with the same number of drive-in receiving openings in its web; and drive pins, equal in number to the number of openings in the web of each planet pinion gear, secured to said driven shaft, each drive pin extending, with clearance, through respective openings in each planet pinion gear.

References Cited

UNITED STATES PATENTS

| | | | |
|---|---|---|---|
| 2,666,345 | 1/1954 | Amberg | 74—804 |
| 2,748,610 | 6/1956 | Schatzel | 74—804X |
| 3,037,400 | 6/1962 | Sundt | 74—804 |
| 3,129,611 | 4/1964 | Lee | 74—804 |

ARTHUR T. McKEON, Primary Examiner